United States Patent [19]

Wiscombe

[11] Patent Number: 4,618,779

[45] Date of Patent: Oct. 21, 1986

[54] SYSTEM FOR PARALLEL POWER SUPPLIES

[75] Inventor: Nathan Wiscombe, Broomfield, Colo.

[73] Assignee: Storage Technology Partners, Louisville, Colo.

[21] Appl. No.: 623,646

[22] Filed: Jun. 22, 1984

[51] Int. Cl.[4] .............................................. H02J 1/10
[52] U.S. Cl. .................................... 307/60; 364/492; 323/909
[58] Field of Search ...................... 307/44, 45, 51, 52, 307/53, 55, 58, 60, 64, 65, 74, 82, 84, 130, 131; 323/268, 270, 271, 909; 364/483, 492

[56] References Cited

U.S. PATENT DOCUMENTS

| | | | |
|---|---|---|---|
| 3,956,638 | 5/1976 | Ahrens et al. | 307/44 X |
| 4,318,007 | 3/1982 | Rizzi | 307/44 |
| 4,356,403 | 10/1982 | Mohat | 307/60 |
| 4,476,399 | 10/1984 | Yoshida et al. | 307/44 |

FOREIGN PATENT DOCUMENTS 164317 10/1982 Japan ..................................... 307/52

Primary Examiner—A. D. Pellinen
Assistant Examiner—Derek S. Jennings
Attorney, Agent, or Firm—Woodcock Washburn Kurtz Mackiewicz & Norris

[57] ABSTRACT

A system and method of connecting power supplies in parallel that provides desired voltage regulation at the load and current sharing between the power supplies. The power supplies are connected in parallel at the load. Each power supply also has a sense line connected at the load. Each power supply includes means for measuring the current delivered to the load. Each supply also includes an electronically controlled variable resistive element in its respective sense line. The amount of current being supplied by each power supply to the load is measured. A controller determines if an unacceptable imbalanced current condition exists, i.e., it determines which power supply is supplying too much or too little current and the controller selectively changes the value of the appropriate variable resistive element in the sense line of that power supply in order to change the current being delivered to the load in a direction that corrects for the imbalanced condition. All such corrections are controlled so that a desired voltage regulation is maintained at the load.

12 Claims, 9 Drawing Figures

SYSTEM FOR PARALLEL POWER SUPPLIES

BACKGROUND OF THE INVENTION

This invention relates to a system for using power supplies in parallel. More particularly, it relates to such a system which provides load current sharing among the power supplies used while providing good voltage regulation at the load. Even more particularly, it relates to such a system which does not require that the power supplies used be identical and which will not cause an overvoltage condition at the load if one of the power supplies fails.

Power supplies are used to provide the required operating power to a piece of electronic equipment, termed the "load". Power (P) is a measure of both the voltage (V) applied to the load and the current (I) delivered to the load (P=V×I). Quite often, it is desirable to connect the output terminals of more than one power supply in parallel in order to supply the desired power. One reason for doing this is to increase the overall reliability of the electronic system. For example, if only one power supply is used, and if that power supply fails, then the entire system is non-operational until the power supply is repaired or replaced. However, if a number of supplies are used in parallel, and if the supplies have sufficient current capacity, then one or more of the supplies can fail without affecting the operation of the electronic system.

The electronic equipment using the power is usually not a static load, meaning that the amount of current required by the load is continually changing as various circuits within the equipment switch on and off. This continual change in current can cause the voltage at the load to change and, if the change is large enough, affect the operation of the equipment. Thus, regulating the voltage at the load is an important consideration, no matter how many power supplies are used.

Current sharing is a second important consideration when power supplies are used in parallel. Depending on how they are connected, one power supply may furnish all the current. If this is not possible, because the total current required by the load exceeds the current capacity of a single power supply, then one or more of the parallel power supplies may be operating at its respective maximum current capacity, while the remaining power supplies may furnish little or no current. If this unbalanced condition occurs, the power supplies that are operating at maximum current capacity, and hence those being stressed at maximum performance levels, are subject to an earlier failure than those not operating at maximum current capacity. Thus, poor current sharing among parallel power supplies can obviate the reason for operating them in parallel, i.e., increased reliability.

FIG. 1-4 illustrate some of the prior art schemes for operating power supplies in parallel. Only two power supplies are shown in each of the figures. However, the same principles apply, regardless of the number used.

FIG. 1 shows two power supplies 10-11 connected in parallel using local sensing. The squares on the power supplies labeled "+", "−", "+S" and "−S" represent the positive, negative, positive sense, and negative sense terminals, respectively, of the power supplies. The positive terminals "+" of each power supply are connected to one side of the load 12 by the cables 13 and 16, while the negative terminals "−" are connected to the other side of the load 12 by the cables 14 and 15. Each cable 13-16 has an inherent resistance, represented by the resistors RC1-RC4, respectively. Since the sense terminals "+S" and "−S" are not used, the internal circuitry will sense the voltage at the output terminals "+" and "−" to regulate the voltage at those terminals. Such operation is known in the art as "local sensing". (The manner in which a power supply uses the sense terminals to regulate voltage is well understood in the art of power supplies and need not be explained here.)

In operation, each power supply 10-11 is set so as to provide the desired voltage across the load. However, it is physically impossible to set both power supplies to exactly the same voltage, so there will always be some difference. The cable resistances, RC1-RC4, can be made very nearly equal by making each cable 13-15 the same diameter and same length. The voltage at the load 12 can, of course, have only one value because it is a single point.

When the power supplies 10-11 are turned on, each will supply a current that causes a voltage drop across the appropriate cable resistance that is equal to the difference between the voltage across the output terminals of the supply and the voltage across the load. Since the output voltages of the supplies are nearly equal, and since the cables resistances are nearly equal, the currents from each supply will be nearly equal. That is, current sharing is very good. However, voltage regulation at the load 12 is poor. As the current required by the load changes, the voltage dropped across the cable resistances changes, thus changing the voltage at the load.

FIG. 2 is a block diagram showing two power supplies connected in parallel using remote sensing. This figure is similar to FIG. 1 except now the sense terminals "+S" and "−S" of the power supplies 10-11 are connected to the load 12 by the wires 17,19 and 18,20 respectively. Since the voltage at the load is directly sensed, load voltage regulation is very good. However, as will be explained, current sharing is poor. Since the two supplies can not be set to exactly the same voltage, one of them will be set to a higher voltage than the other. This power supply will furnish all of the current (or up to its maximum capacity) in order to make the voltage drop at the load equal to its voltage adjustment setting. The remaining power supply will not have to furnish any current (or not nearly as much) for the load voltage to reach its voltage adjustment setting, as the voltage setting may already be exceeded with current from the other supply.

FIG. 3 is another prior art configuration showing two power supplies connected in parallel in a "master-slave" configuration. The master power supply 10 has its sense terminals connected to the load 12 by the wires 17-18. The remaining power supplies, the slaves, represented by the single power supply 11, do not have their sense terminals connected and thus operate in local sense.

The master power supply 10 of FIG. 3 has its output voltage set to the desired value, and because of remote sensing, provides very good voltage regulation at the load. The slaves 11 are set at a slightly higher voltage. The slave power supplies 11 have their current limit controls set such that they can only supply a desired fraction of the total current. The master supply 10 then provides very good voltage regulation and the remaining current required in the manner described in conjunction with FIG. 2. The disadvantage of this configuration is that it depends upon the continued operation of the master power supply to provide very good voltage regulation. If the master power supply should fail, the whole system will fail and possibly cause an overvoltage, undervoltage, or shut off condition to occur.

FIG. 4 shows two power supplies connected in parllel using forced current sharing. The figure shows a portion of the internal circuitry, the resistors R1–R4 and the PWM (pulse width modulator) 21, of each power supply 10–11. This internal circuitry uses the voltage on the sense terminals to control the output voltage. This control is achieved by using the sense terminal voltage to control the PWM. If the sense voltage changes, the width of an output pulse from the PWM changed in order to force the voltage back to a desired level. The detailed operation of the internal circuitry of the power supplies 10 or 11 is well understood in the art and need not be explained here.

As shown in FIG. 4, the inputs to the PWM's 21 of each power supply 10–11 are tied together by a wire 22. Thus, the voltage input of each PWM 21, is the same and their response is similar. Very good current sharing results from this configuration since the only difference in current is caused by the small differences in the cable resistances RC1–RC4. The major disadvantage of the configuration shown in FIG. 4 is that it requires all the operating parallel power supplies to have the same voltage sensing circuits therewithin. This is not always possible. (e.g., not all power supplies provide a means for connecting a jumper 22 between the voltage sensing circuits.) In many cases, the power supplies are purchased components and it is desirable to purchase them from a number of vendors in order to insure an adequate supply. When this is done, it is usually not possible to mix power supplies from different manufacturers, since their internal voltage sensing circuits are not the same.

Other schemes are known in the art to operate power supplies in parallel in addition to those shown in FIGS. 1–4. As an example, one such scheme monitors the current being supplied to the load by each power supply and electronically alters the voltage being sensed by the supply, which alternation steers the output voltage in a direction that maintains the current at the desired level. The primary disadvantage of this approach is that the means used to alter the voltage, usually an operational amplifier, is subject to fail in a manner that can cause the power supply to increase its output voltage beyond the safe operating limit of the load. Unfortunately, this overvoltage condition can cause the load to fail also.

It is apparent from the preceding discussion that a need exists in the art for a system of operating power supplies in parallel which provides good current sharing, good voltage regulation at the load, does not require that power supplies with identical internal voltage sensing circuits be used, and will not cause an overvoltage on the load if it should fail.

SUMMARY OF THE INVENTION

It is an object of the present invention to provide a system and method of connecting and operating power supplies in parallel that results in both good current sharing between the power supplies and good voltage regulation at the load.

It is a further object of the invention to provide such a system and method of using parallel power supplies that does not cause an overvoltage condition if it should fail, and that does not require the power supplies to have identical voltage sensing circuits therewithin.

The above and other objects of the invention are realized through the use of a parallel power supply configuration that includes remote and local sensing features, in conjunction with a means for sensing the current delivered to the load and a means for adjusting the voltage applied to the sense terminal of the supply in response to the sensed load current. In a preferred embodiment, the load current sensing means may be realized with a fixed resistor placed in series with the power cable tied to the load; and the means for adjusting the sense voltage may be realized with a variable resistive element, such as a FET (field effect transistor), that assumes a resistive value in response to a control signal. The control signal may be generated by a single controller adapted to be responsive to the sensed load current. Advantageously, any number of power supplies can be connected in parallel using the parallel configuration of the present invention. Each power supply in the configuration employs remote sensing to insure good voltage regulation at the load.

As explained previously, when remote sensing is used, very good voltage regulation at the load is realized; but poor current sharing results. When local sensing is used, very good current sharing is realized at the cost of poor voltage regulation. During remote sensing, the external resistance between the sense terminals and the load is small (the resistance of the sense wire). During local sensing, the external resistance between the sense terminal and the load is very high (infinity). The present invention takes advantage of these two extremes in external resistance values by placing a variable resistance in series with each sense line. Placement of this resistance in this manner causes voltage regulation at the load to be somewhat poorer than that of remote sensing, but better than that of local sensing, while current sharing is somewhat poorer than that of local sensing but better than that of remote sensing. Based upon the current each power supply is furnishing, the resistance value of each variable resistor is adjusted in order to achieve a desired compromise between current sharing and voltage regulation at the load. This compromise can be weighted either way, but in general, it gives both good current sharing and good voltage regulation at the load.

As an added feature of the invention, when a field effect transistor (FET) is used as the variable resistance element, failures of the system components can not cause a dangerous overvoltage condition. If the FET should fail, it can only fail in the open or shorted direction, causing the power supply to revert to purely local or remote sensing, respectively. The controller (used to generate the control signal that controls the resistance of the FET) can only fail in a manner that causes the FET to have maximum or minimum resistance; and therefore a failure of the controller cannot cause a power supply to generate an overvoltage condition.

BRIEF DESCRIPTION OF THE DRAWINGS

The above and other objects, features, and advantages of the present invention, will be more apparent from the following description of the preferred embodiment thereof, given in conjunction with the following drawings, wherein.

DESCRIPTION OF THE PREFERRED EMBODIMENT

The following is a description of the best presently contemplated mode of carrying out the present invention. This description is given only to illustrate the principles and advantages of the invention and is not to be taken in a limiting sense. To ascertain the true scope of the invention, reference should be made to the appended claims. It is noted that like numerals are used to reference like parts throughout all of the figures and accompanying discussion.

FIGS. 1-4 were previously discussed in conjunction with the BACKGROUND material, presented above.

Figure 1:
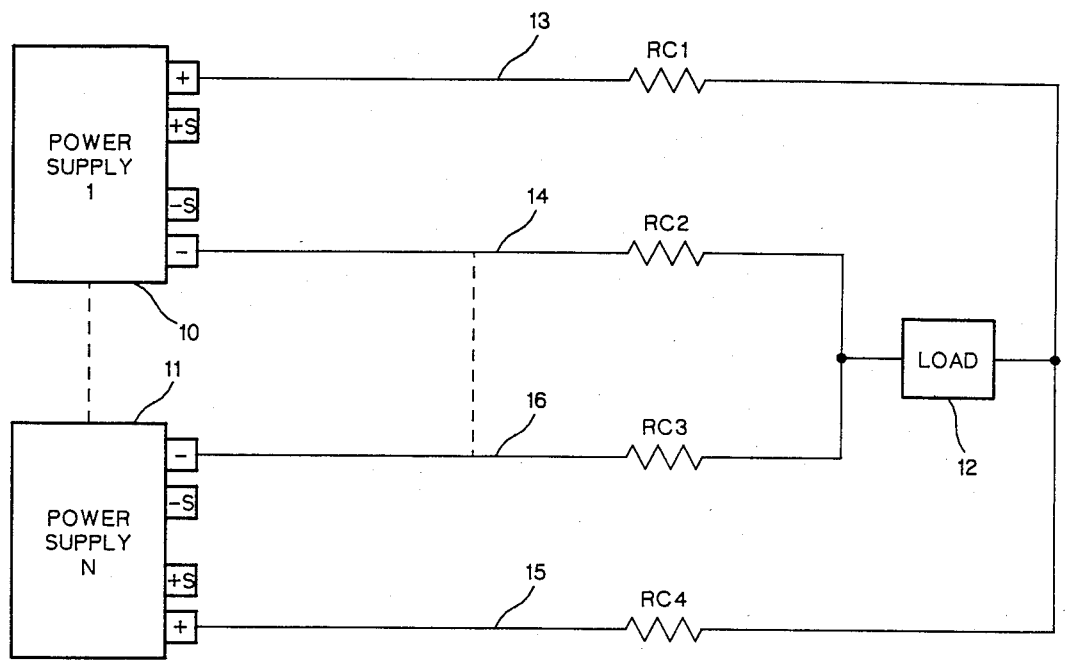
FIG. 1 is a prior art block diagram showing two parallel power supplies using local sensing to achieve current sharing.
Figure 2:
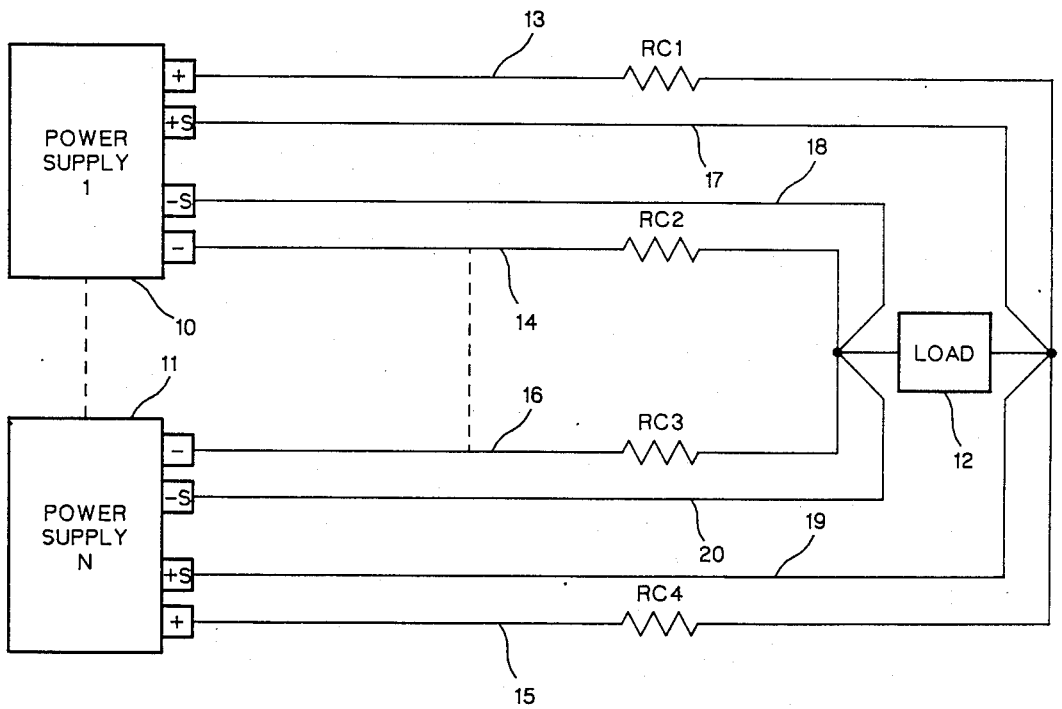
FIG. 2 is a prior art block diagram showing two parallel power supplies using remote sensing to achieve voltage regulation at the load.
Figure 3:
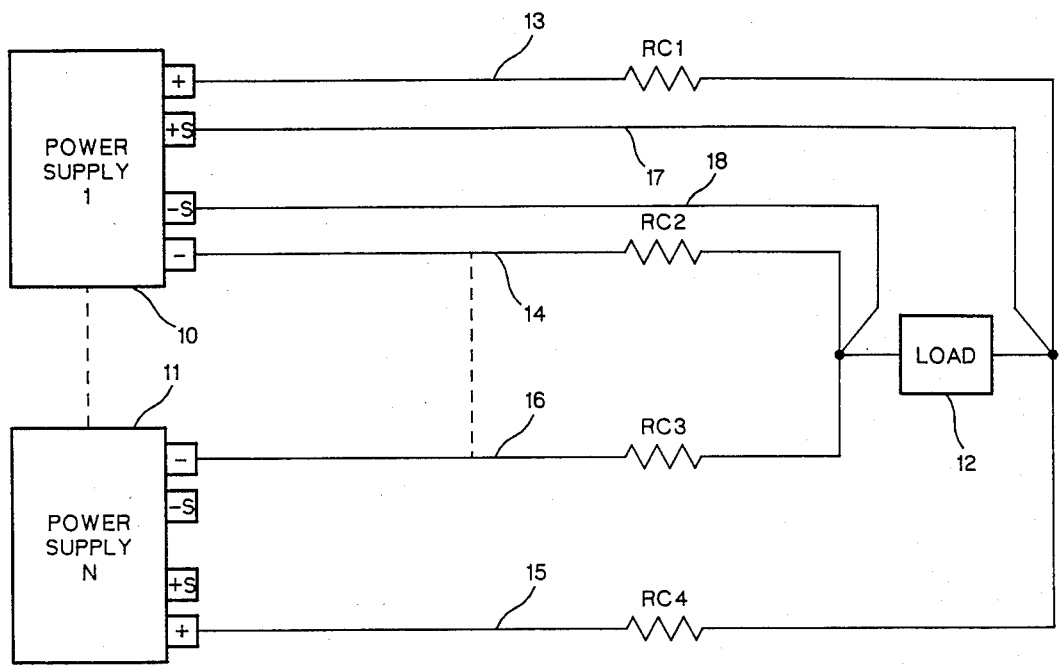
FIG. 3 is a prior art block diagram showing two parallel power supplies in a "master-slave" configuration.
Figure 4:
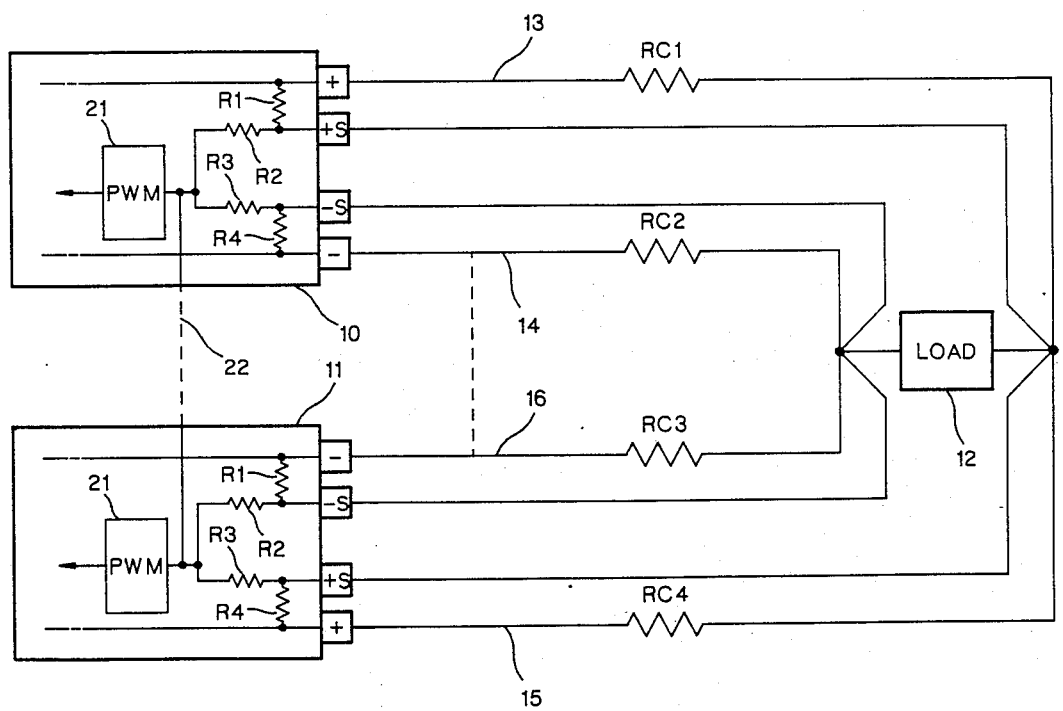
FIG. 4 is a prior art block diagram showing two parallel power supplies using forced current sharing.
Figure 5:
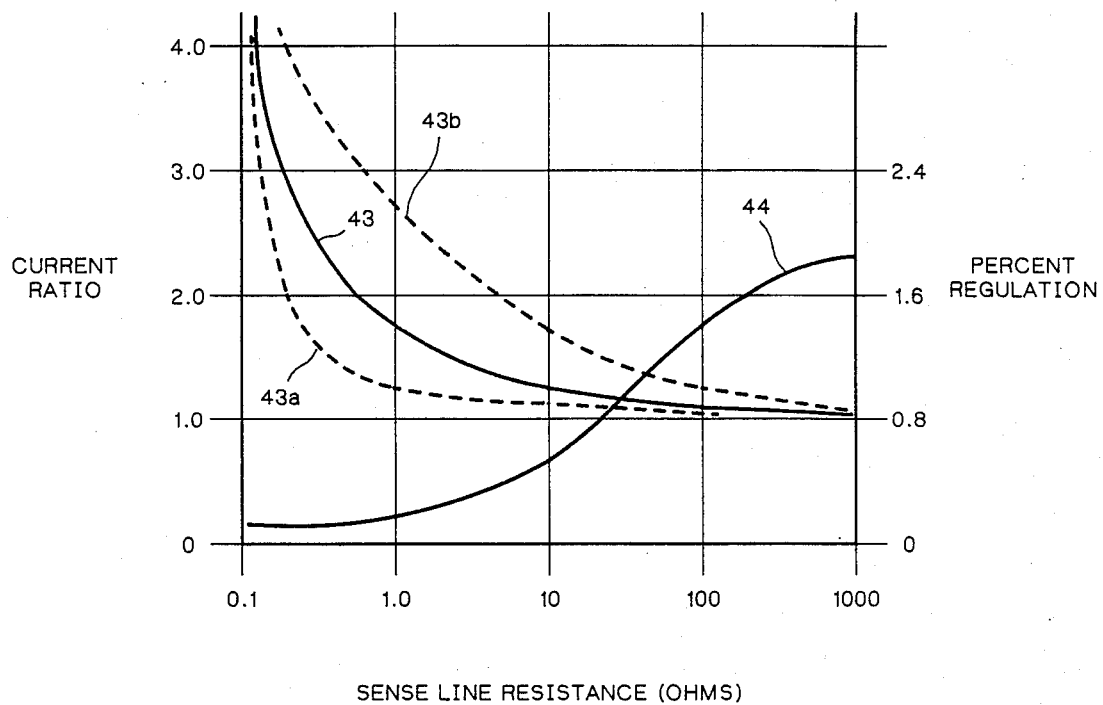
FIG. 5 is a graph showing the variation in current sharing and voltage regulation for two parallel power supplies as a function of the sense line resistance.

FIG. 5 graphs the change in current sharing and the change in voltage regulation at the load for a configuration in which two power supplies are connected in parallel as the sense line resistance is varied. FIG. 5 shows two curves 43 and 44. Curve 43 represents the typical current sharing of the two power supplies. In the example shown, current sharing is defined as the ratio of the currents of the two power supplies. Hence, balanced current sharing results when the cument ratio is 1.0. Curve 43 is to be read in conjunction with the left vertical axis and the horizontal axis. In practice, curve 43 is merely representative of a family of curves, as represented by the dashed curves 43a and 43b in FIG. 5. The particular curve within the family that defines the current ratio achieved as a function of sense line resistance depends upon how close the voltage adjustment settings of the respective power supplies are set with respect to each other. If multiturn potentiometers are used for this voltage adjustment setting, then the voltage values can be set reasonably close to each other and a good curve such as 43a is achieved. However, multi-turn potentiometers are expensive to use, and only provide a desired voltage setting under one set of environmental conditions. (All power supplies will exhibit some drift in component values over environmental extremes, and these drifts are generally translated to a change in output power.) Curve 44 (FIG. 5) represents the voltage regulation at the load for the two power supplies. Voltage regulation at the load is expressed as the percent that the voltage at the load will vary from the desired value. Curve 44 is to be read in conjunction with the right vertical axis and the horizontal axis. Note that the horizontal axis is logarithmic and represents the resistance of the sense lines of the power supplies.

When the sense line resistance is very large, e.g., local sensing is being used, FIG. 5 shows that the current sharing, curve 43, approaches unity. That is, the two power supplies are furnishing the same current. However, voltage regulation, curve 44, is poor. The graph of FIG. 5 shows that the curve 44 approaches 2 percent, meaning that the voltage at the load could vary as much as 2 percent.

If the sense line resistance is very small, e.g., remote sensing is being used, FIG. 5 shows that current sharing becomes very poor, with the curve 43 approaching a large number on the left axis. This means that one power supply is supplying all, or most, of the current. The voltage regulation, however, becomes very good as curve 44 approaches zero on the right axis.

FIG. 5 also illustrates that there is an optimum (or at least acceptable) mode of operation for two parallel supplies falling somewhere between remote and local sensing. For example, if the sense line resistance is 10 ohms, the curve 43 shows that the current ratio would be about 1.2. This means that one supply would be furnishing approximately 45% of the cument and the other supply would be furnishing approximately 55% of the current. While this is not the almost perfect current sharing (current ratio 1.0) that can be obtained using local sensing, it would be considered acceptable for most applications. Further, the curve 44 indicates that the voltage regulation at the load for this 10 ohmn sense line resistance would be about 0.5 percent. While this is not as good as the 0.3 percent regulation that can be obtained with remote sensing, it is about four times better than the regulation obtainable with local sensing.

The present invention advantageously controls the resistance of the sense line in order to achieve both acceptable current sharing and acceptable voltage regulation at the load. In this regard, it must be emphasized that the graph of FIG. 5 is only representative of two power supplies connected in parallel. (The numbers included in FIG. 5 merely indicate the operating characteristics, and are not to be taken as exact numbers.) Also, as mentioned in connection with curve 43, curves 43-44 may vary in shape, dependent upon the types of power supplies used and other factors. However, the principles illustrated in FIG. 5 do apply for any number of power supplies connected in parallel.

Figure 6:
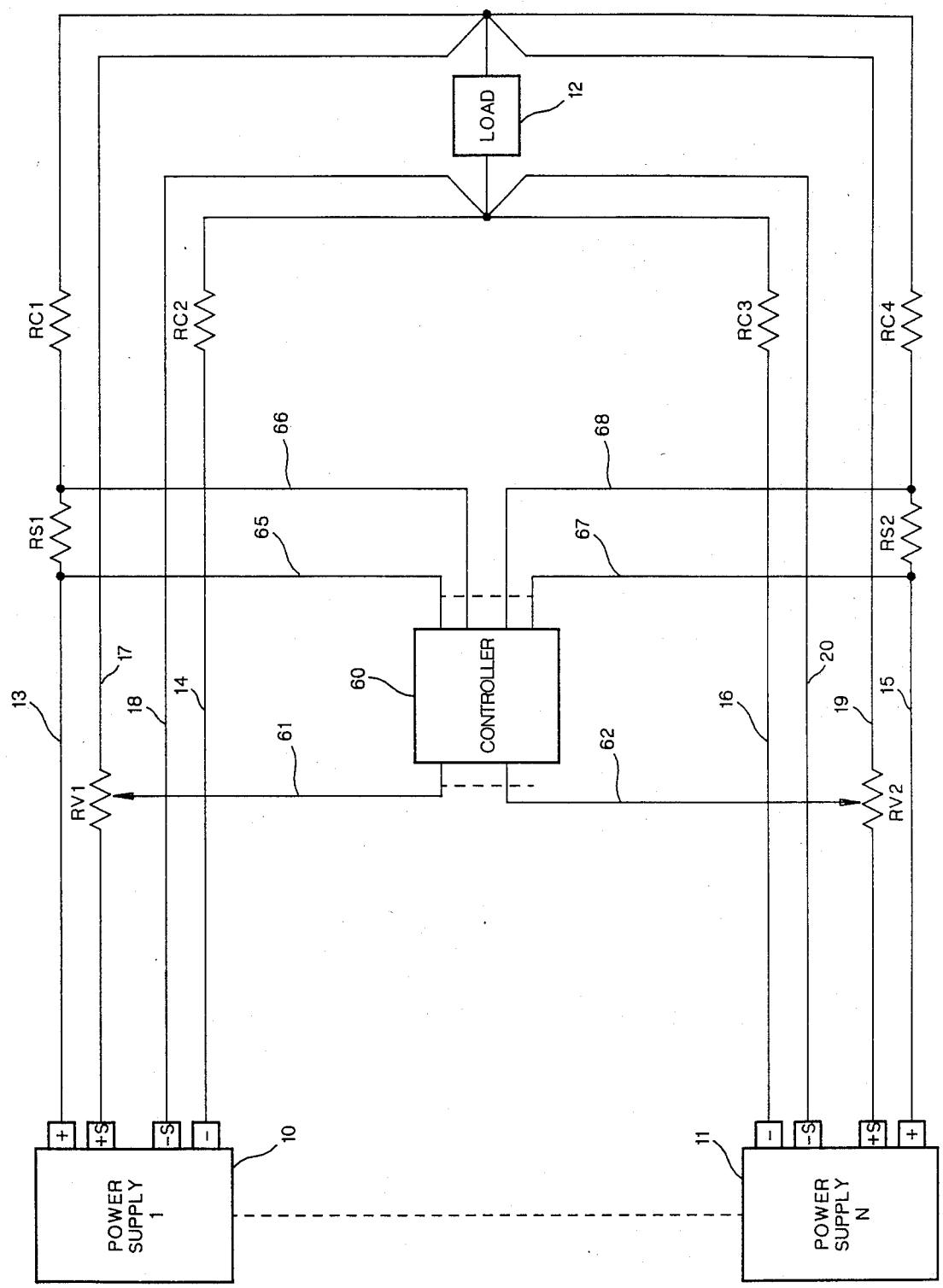
FIG. 6 is a block diagram of the preferred embodiment of the present invention.

FIG. 6 is a block diagram of the preferred embodiment of the present invention. Only two power supplies 10, 11 are shown for clarity, but any number could be used. FIG. 6 is similar to FIG. 2 in that each power supply uses remote sensing. However, resistors RS1, RS2 are added in series with the cables 13 and 15, respectively, which connect the positive terminals of the power supplies 10, 11, respectively, to the load 12. Variable resistor elements RV1 and RV4 are also added in series with the sense lines 17 and 19, respectively.

All the current furnished by the power supplies 10 and 11 flows through the resistors RS1 and RS2, respectively. These resistors are low resistance, high precision resistors. In the preferred embodiment, they have a value of 100 micro-ohms with a tolerance of 1%. The current flow through the resistors causes a voltage drop thereacross. The controller 60, using wires 65 and 66, measures the voltage drop across the resistor RS1; and using lines 67 and 68 measures the voltage drop across RS2. As will be explained later, the controller 60 uses the measured voltage drop, which is proportional to the current flowing through the resistors, to determine how much current is being furnished by each power supply 10 or 11 to the load 12.

In accordance with the present invention, based upon the current power supply 10 is furnishing to the load, the controller 60 adjusts the value of the variable resistors RV1 in the sense lines 1. Similarly, the controller 60 adjusts the value of the variable resistor RV2 in the sense lines 19 based upon the current power supply 11 is furnishing to the load. These adjustments cause the current sharing of the power supplies to be within the desired ratio. Hence, a desired compromise between good current sharing and good voltage regulation is realized.

Figure 7:
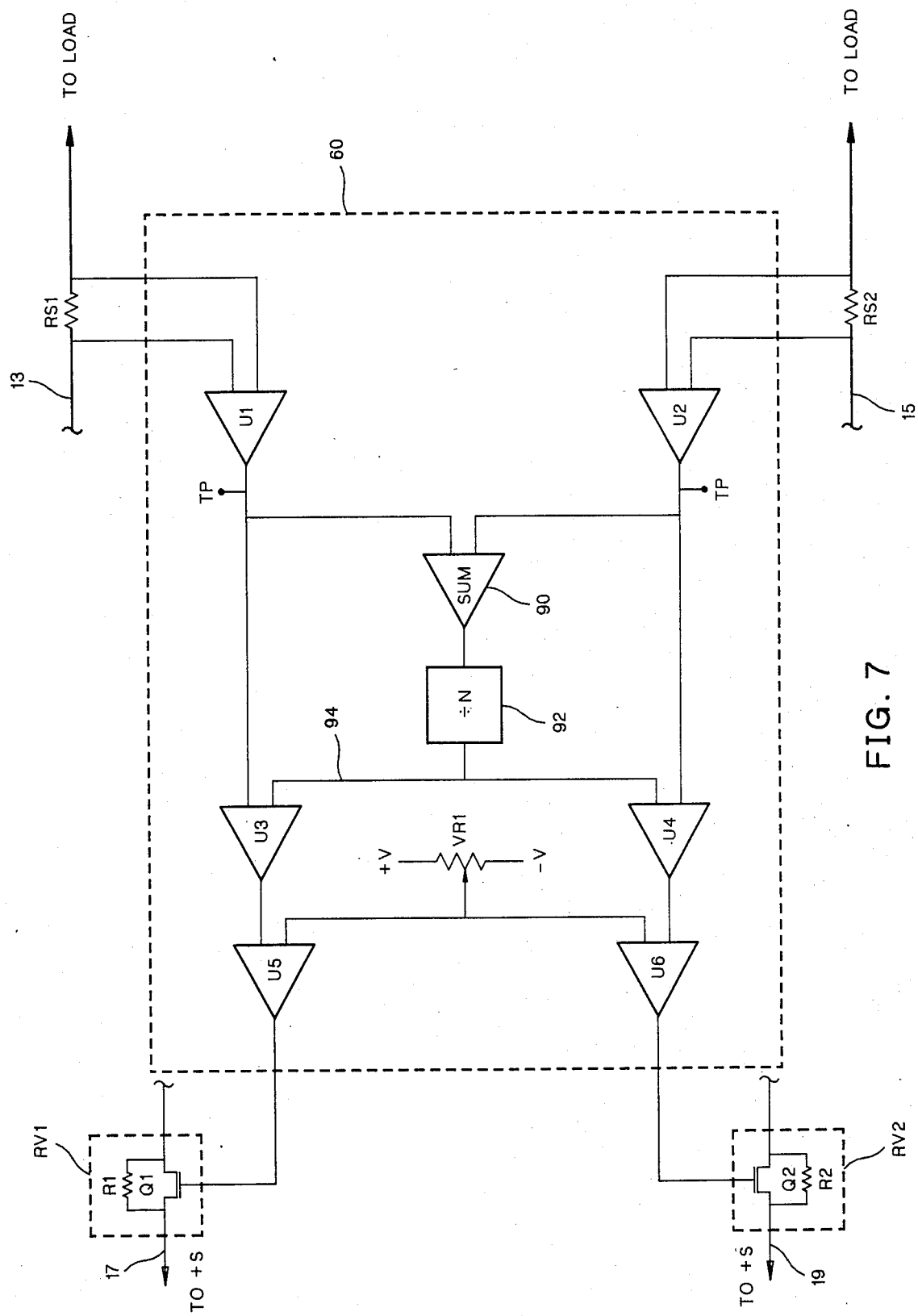
FIG. 7 is a diagram of a controller that could be used with the present invention.

Referring next to FIG. 7, a simplified schematic diagram of the controller 60 is shown. In FIG. 7, the variable resistors RV1 and RV2 are realized with FET transistors Q1 and Q2. The current sense resistors RS1 and RS2 are realized using low impedance precision resistors, as previously described. (It is noted that alternative mans could be employed to sense the current flowing through the power lines 13 and 15 other than through the use of small precision resistors. Such alternative means are considered equivalent to the current measuring technique described herein for purposes of this patent application). The voltage developed across RS1 and RS2 is measured by differential amplifiers U1 and U2, respectively. Amplifiers U1 and U2 are also configured with an appropriate gain factor so that the output signal of each amplifer represents an accurate, scaled measurement of the current flowing through the power lines 13 and 15 to the load. A test point, TP, is provided at the output of U1 and U2 to facilitate monitoring this value.

The measured current values are summed in summing amplifier 90 and divided by the dividing circuit 92 so as to produce a signal on signal line 94 that represents the average current delivered to the load by each power supply. (Note, the dividing circuit 92 divides the sum of all the currents delivered to the load by the number of power supplies connected in parallel. It will also divide the sum of all the currents by the number of power supplies minus one in the event of a power supply failure so that the remaining operational power supplies will still share current.) Differential amplifiers U3 and U4 compare this average current value to the current provided by each supply to the load as measured by U1 and U2. The difference between the actual current and the average current, i.e., the output signal from amplifiers U3 and U4 is then compared against a reference signal, generated by variable resistor VR1, in differential amplifiers U5 and U6. The output of amplifier U5 and U6 is coupled to the gate or control terminals of FET Q1 and Q2, respectively, so as to controllably vary the resistance thereof, which resistance represents the primary resistance in the sense lines 17 and 19. Note that the resistor VR1 is set to provide a reference signal that steers the sense line resistance to a value that provides both acceptable current sharing between the parallel supplies and adequate voltage regulation at the load (see FIG. 5). Also note that resistors R1 and R2 may be shunted across Q1 and Q2, respectively, if desired so as to ensure a maximum sense line resistance that is less than infinity.

Figure 8:
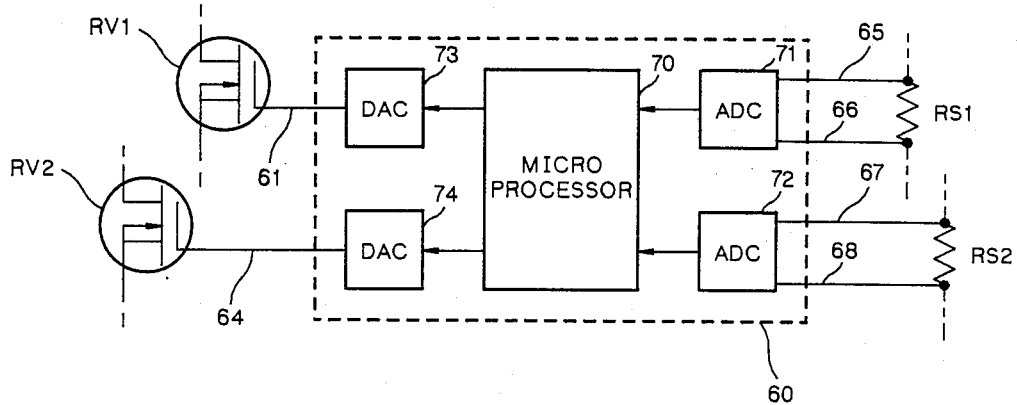
FIG. 8 is an alternative embodiment of the controller.

FIG. 8 shows a simplified block diagram of an alternative embodiment of the controller 60. The portion of the controller applicable to the present invention includes a microprocessor 70, a plurality of analog to digital converters (ADC's) 71, 72, and a plurality of digital to analog converters (DAC's) 73, 74. In practice, there is a DAC for every variable resistive element used and an ADC for every current measuring resistor used; or, alternatively, a multiplex scheme is used so that only one variable resistive element and current measuring resistor is connected to a given DAC or ADC at any one time. For simplicity, the figure only shows two of each DAC and ADC.

The microprocessor is a micro-programmed device that can read signals on its inputs, sent signals to its outputs, and perform a number of arithmetic and logic functions. Such devices are commercially available from a number of manufacturers such as the 6800 series of microprocessors available from Motorola. Likewise DAC's and ADC's are commercially available components that may be purchased from numerous vendors, or that may be ready fabricated by those skilled in the art using commercially available components.

Figure 9:
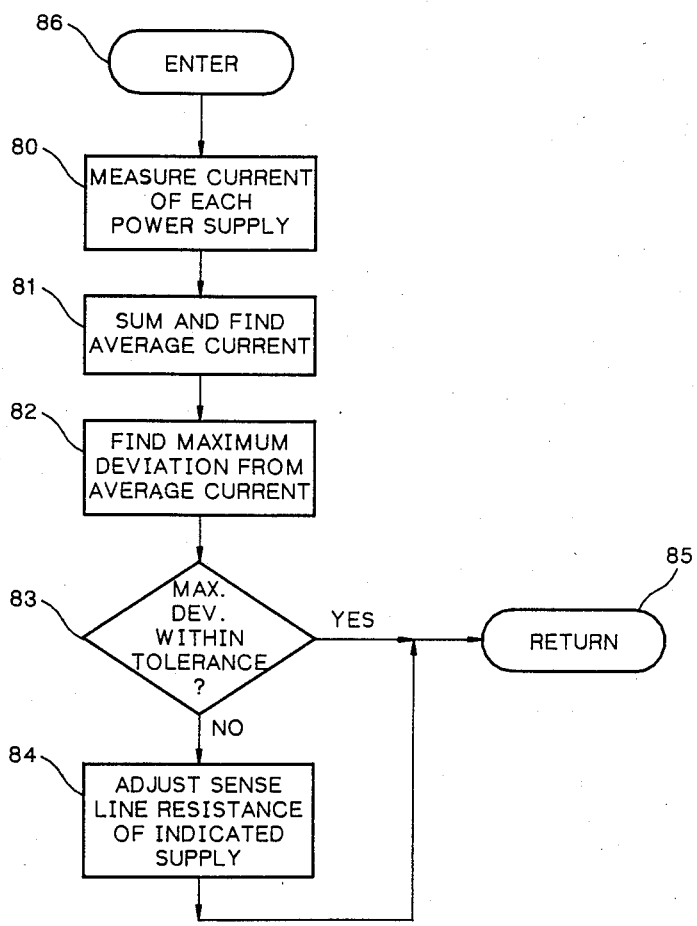
FIG. 9 is a flow chart of a micro-program used with the controller of FIG. 8.

FIG. 9 is a generalized flow chart of a micro-program, that could be used within the microprocessor of FIG. 8. The micro-program enters the portion of the program applicable to the invention at a first step represented by the block 86. In block 80, the current being furnished by each power supply to the load is measured. The ADC's 71 and 72 are used, one at a time, by the microprocessor to measure the voltage drops across the resistors RS1 and RS2. The current being furnished is found through a simple application of Ohm's law, $I = V/R$. In a next step, block 81, the average current is found in block 81 by summing each of the currents measured and dividing the sum by the number of power supplies used. If current sharing were perfect, each power supply would furnish the average current.

In the step indicated in block 82, the measured current that has the maximum deviation from the average current is found. This is done by finding the difference between each measured current and the average current, and then finding the difference which has the largest magnitude.

A decision is made in the step indicated in block 83 as to whether any of the power supplies need to have their current adjusted. In the description of FIG. 5, it was mentioned that a sense line resistance of 10 ohms would cause one power supply to furnish 45% of the current and the other 55%. This is a 10% deviation from the ideal average of 50% for each supply, but might be considered acceptable because of the better voltage regulation at the load that results. Data can be obtained, similar to that shown in the graph of FIG. 5, for any number of supplies, based upon laboratory measurements or other means. Such data could be collected for each power supply, and this data could be combined in tubular or graphic form so that a decision could be made as to an acceptable current sharing value or ration that would still give an acceptable voltage regulation at the load.

To illustrate, assume that four power supplies are used in parallel and the data collected on these supplies shows that when the percents of total current supplied by each of the supplies are 22%, 23%, 27% and 28%, the voltage regulation at the load is at an acceptable value. The ideal current sharing would have each power supply furnishing 25% of the current. The maximum variations from this are 22% and 28%, which, are 12% deviations with respect to the ideal average. Thus, in the step depicted in block 83, the maximum deviation from the average current is checked to see if it is less than 12%.

If in step 83 the maximum deviation is within tolerance, the micro-program returns to the main part of the program as shown in block 85. If the maximum deviation is not within tolerance, the power supply having the maximum deviation has the variable resistance in its sense line adjusted, as shown in block 84, in order to force the deviation to be within tolerance. This adjustment is carried out as explained in the following paragraph.

The variable resistors VR1 and VR2 are realized using any suitable FET or voltage controlled resistor (VCR) element. In the preferred embodiment, depletion type field effect transistors are used. The microprocessor 70 outputs a digital word to the appropriate DAC's 73 and 74 which convert the digital signal to an analog signal and apply it to the gate of the appropriate FET RV1, RV3 via the small lines 61 and 64. A depletion type FET has a very low channel resistance (the electrical path between the source and drain) for zero gate to source voltage. The channel resistance can be decreased or increased according to the polarity and magnitude of the applied gate to source voltage. A preferred range of resistance is from 0.3 to 500 ohms. After adjustment, the micro-program returns to the main program via the step of block 85.

The flow chart of FIG. 9 implies that the controller microprocessor 70 performs tasks other than controlling the sense line resistance of parallel power supplies. Given the operating speed of microprocessors, this dual or multiple role is possible, although it is not necessary. Regardless of whether the microprocessor is dedicated to controlling the sense line resistance of parallel power supplies in accordance with the present invention, or also performs other tasks, the micro-program of FIG. 9 is executed hundreds to thousands of times per second.

In accordance with the present invention, good current sharing and good voltage regulation at the load are maintained. The power supplies do not have to have the same type outputs since the series resistance elements in the sense lines are used to maintain the desired current sharing. If FET's are used for this element, they can only fail in a high resistance or low resistance mode, causing the power supply to revert to local or remote sensing. Also any failure mode of the controller can only cause the FET to go to a very high or a very low resistance. Thus, no failure mode can occur that would cause a power supply to generate an overvoltage condition. If one power supply should fail, the controller 60 will attempt to increase its current, but will get no response. The other supplies will automatically see a need for increased current as the load voltage drops slightly. Each will increase its current, but all currents provided by the non-failed supplies will remain proportional to each other. If the microprocessor embodiment of FIG. 8 is employed, the program of FIG. 9 may include the capability of detecting a power supply that is non-responsive to commands for more current and that is providing zero current. If such a zero current condition is detected, the average current calculated in the step described in block 81 would be modified to reflect the fact that one less power supply is operational, so that a correct calculation of average current could be made.

While a preferred embodiment or embodiments of the present invention have been described herein, numerous modifications and variations could be made thereto by those skilled in the art without departing from the spirit and scope of the claimed invention. All such modifications or variations are intended to be covered by the claims which follow.

What is claimed is:

1. A system for connecting a plurality of power supplies in parallel, each of said power supplies having an output terminal for connecting a power line between the output terminal and a common load, and a sense terminal for connecting a sense line between the sense terminal and the common load, each of said power supplies having control means therewithin for adjusting the power delivered to said common load over said power line in response to a sense signal appearing at said sense terminal, said system comprising:
    means for sensing the current delivered to the load through the power line of each of said power supplies;
    means for comparing the current sensed by said sensing means against a desired shared current value, and for generating a control signal representative of said comparison; and
    means responsive to said control signal for varying said sense signal appearing at the same terminal of each of said power supplies in a manner that causes the current delivered by that power supply to the load to approach said desired current value, wherein said means for varying the sense signal appearing at the sense terminal comprises a variable impedance element inserted into the sense line of each power supply, said variable impedance element having an impedance that varies as a function of a signal applied to a control terminal thereof, said control signal generated by said comparison means being coupled to the control terminal of said variable impedance element.

2. The system of claim 1 wherein said desired shared current value is selected at a value that allows a desired voltage regulation to be realized at the load.

3. The system of claim 1 wherein said variable impedance element comprises a field effect transistor (FED), said FET having a gate terminal that functions as said control terminal.

4. The system of claim 1 wherein said comparison means for comparing the current sensed by the sensing means against a desired shared current value comprises:
    means for determining an average current that is the average of all the currents delivered to said load by each of said power supplies;
    means for determining a difference current for each power supply that is the difference between the actual current delivered to the load by that power supply, as sensed by said sensing means, and said average current;
    means for comparing the difference current of each power supply against said desired shared value; and
    means for generating said control signal in response to the comparison of said difference current and said desired shared current.

5. The system of claim 4 wherein said average current determining means, difference current determining means, difference current comparison means, and control signal generating means comprise a microprocessor that is programmed to carry out the respective specified functions.

6. An apparatus for connecting a plurality of power supplies in parallel such that each power supply provides a portion of the power delivered to a common load, comprising:

connecting means for connecting a power output terminal of each power supply to said load;

current measuring means for measuring the current flow in each of said connecting means;

voltage sensing means for sensing the voltage developed at said load, said voltage sensing means including a voltge sense line connected between said load and each of said power supplies;

a variable impedance element inserted into said voltage sense line, said variable impedance element having an impedance value associated therewith that varies as a function of a control signal applied thereto; and a control element coupled to said voltage sensing means, said control element being configured to generate the control signal that is applied to said variable impedance element, said control signal having a value associated therewith that is a function of the measured current flowing to said load, and said control signal having a value that maintains the impedance of said variable impedance element within a desired range.

7. The apparatus of claim 6 wherein said desired range within which the control signal maintaining the impedance of said variable impedance element is selected to maintain the current ratio of the currents delivered to said load, and to maintain the regulation of the voltage developed at said load, within prescribed tolerances.

8. The apparatus of claim 7 wherein said desired range of the variable impedance element comprises 0.3 to 500 ohms.

9. The apparatus of claim 6 wherein said control element includes:

means for determining an average current value, said average current value comprising the sum of all the measured current values of the currents flowing in each of said connecting means divided by the number of power supplies that are connected in parallel;

means for determining the difference between said average current value and the measured current value for each connecting means; and means for generating said control signal in response to: the determined difference between the average and measured current values, and a desired current ratio of the currents delivered to said load and a desired voltage regulation of said load.

10. The apparatus of claim 9 wherein said control element comprises a microprocessor.

11. A method for connecting a plurality of power supplies in parallel such that each shares the current delivered to a common load connected to said power supplies, and such that a desired voltage regulation is maintained at said load, each of said power supplies having a sense terminal for connecting a sense line between said sense terminal and said load, and each power supply having control means therewithin responsive to a sense signal appearing at said sense terminal for adjusting the amount of power delivered to said load by said power supply, said method comprising the steps of:

(1) measuring the current delivered to said load by each of said power supplies;

(2) comparing the current measured in step (1) to a desired current value, said desired current value comprising a shared current value that provides an acceptable ratio of shared currents amongst said plurality of power supplies, as well as an acceptable voltage regulation at said load; and (3) modifying the sense signal applied to the sense terminal of each power supply in response to the comparison of step (2) so as to steer the measured current closer to the desired current value for each power supply, wherein step (3) comprises:

(a) connecting a sense line, between the load and the sense terminal of each power supply, (b) inserting a variable impedance element into each sense line, and (c) varying the impedance of each variable impedance element about a selected impedance value as a function of the comparison of step (2), said selected impedance value causing said sense signal applied at the terminal of each power supply to vary an appropriate amount so as to steer the current delivered to said load towards said desired current value.

12. The method of claim 11 wherein steps (1) through (3) are carried out under control of a microprocessor.

* * * * *